United States Patent [19]

Ishiguro

[11] Patent Number: 5,627,532
[45] Date of Patent: May 6, 1997

[54] SWITCH PANEL DEVICE

[75] Inventor: Masamitsu Ishiguro, Tokyo, Japan

[73] Assignee: Japan Aviation Electronics Industry Limited, Tokyo, Japan

[21] Appl. No.: 351,499

[22] Filed: Dec. 7, 1994

[30] Foreign Application Priority Data

Dec. 24, 1993 [JP] Japan ................................. 5-328044
Oct. 5, 1994 [JP] Japan ................................. 6-241345

[51] Int. Cl.$^6$ ................................................ H03M 11/00
[52] U.S. Cl. ........................................ 341/23; 345/170
[58] Field of Search .............................. 341/23; 200/314;
364/709.15; 362/317; 400/479; 359/41,
54, 82; 353/31; 434/365; 345/170

[56] References Cited

U.S. PATENT DOCUMENTS

| | | | |
|---|---|---|---|
| 3,934,242 | 1/1976 | Mueller | 345/170 |
| 4,078,257 | 3/1978 | Bagley | 364/709.15 |
| 4,551,717 | 11/1985 | Dreher | 345/170 |
| 4,613,207 | 9/1986 | Fergason | 359/41 |
| 4,844,637 | 7/1989 | Buisson et al. | 341/23 |
| 4,846,694 | 7/1989 | Erhardt | 434/365 |
| 4,853,888 | 8/1989 | Lata et al. | 345/172 |
| 4,906,071 | 3/1990 | Takahara | 359/82 |
| 4,944,578 | 7/1990 | Denison | 359/54 |
| 4,971,436 | 11/1990 | Aoki | 353/31 |
| 5,049,866 | 9/1991 | Miyajima | 345/87 |
| 5,225,818 | 7/1993 | Lee | 345/170 |

FOREIGN PATENT DOCUMENTS 0294293  12/1988  European Pat. Off. .

OTHER PUBLICATIONS

IBM Tech Disclosure Bulletin, vol. 23 No. 10 Mar. 1981 Optically Powered and Controlled Electronically Alterable Key Labeling H.D. Maxey.

Primary Examiner—Jeffery Hofsass
Assistant Examiner—Albert K. Wong
Attorney, Agent, or Firm—Pollock, Vande Sande & Priddy

[57] ABSTRACT

This invention provides a switch panel device capable of changing indicia for identifying switch elements in a short time. The switch panel device comprises a transparent frame holding switch elements such that the operating ends of the switch elements project forwardly from the frame, a diffusion sheet applied to the front surface of the frame, and an LCD projector for projecting images of characters identifying the respective switch elements below and in juxtaposition to the corresponding operating ends of the switch elements.

13 Claims, 6 Drawing Sheets

SWITCH PANEL DEVICE

FIELD OF THE INVENTION

This invention relates to a switch panel device for input operations in various equipment and apparatus, and particularly to such a switch panel device having indicia affixed thereto for identifying various individual switch elements.

BACKGROUND OF THE INVENTION

FIGS. 1A and 1B illustrate one type of prior art switch panel device which comprises a switch panel 11 mounted to a housing 10, for example, of an electronic equipment so as to close the front opening thereof. The switch panel 11 comprises a frame 12 having an array of switch elements 13 secured thereto such that the "keytops" or operating ends 13a of the switch elements 13 project beyond the outer face or front face of the switch panel 11.

Applied to that side of the frame 12 from which the operating ends 13a project is a sheet 14 on which there are printed indicia 15 such as characters, symbols, figures or the like for identifying the switch elements 13. The indicia 15 are positioned adjacent to the operating ends 13a of the respective switch elements such that they are not interfered with by the operating ends.

FIG. 1C shows another type of prior art switch panel device which comprises a touch switch sheet 17 applied to the screen of a CRT display 16 which is in turn mounted in a housing 10 with the screen facing toward the front opening of the housing. The touch switch sheet 17 comprises a transparent sheet and transparent electrode switches (touch switches) arranged thereon in an array. Characters or symbols for identifying the respective touch switches are displayed on the CRT display 16 at the portions thereof corresponding to the respective touch switches of the touch switch sheet 17.

FIG. 1D illustrates still another type of switch panel device utilizing an LCD display 18 in place of the CRT display 16. While not shown in the drawings, it is conceivable to eliminate the sheet 14 in FIGS. 1A and 1B and embed LCD's in the respective keytops 13a to display the indicia for designating the respective keytops 13a.

In the case of the conventional switch panel 11 shown in FIGS. 1A and 1B, when the user calls for a custom-made switch panel 11 having altered indicia 15 applied thereto for designating the switch elements, the manufacturer is required to prepare a new switch panel having a sheet 14 printed with the altered indicia 15, which takes time before the new switch panel is delivered to the user.

The manufacturer may have a number of preliminarily-made switch panels in stock in order to cope with users' calls for short time delivery. However, if none of the switch panels manufactured in advance should meets user's request for modified indicia, it would be required to remove a sheet 14 from one of the switch panels in stock to replace it by a new sheet having the modified indicia printed thereon, which is a time-consuming task.

In addition, the working face of the switch panel 11 is usually compelled to have a planar surface due to limitations imposed by the flexibility and application properties of the sheet 14, resulting in difficulties in realizing a variety of designs of the switch panel as utilizing curved surfaces as required.

With the construction utilizing s CRT display 16 and a transparent touch switch sheet 17 as a switch panel as illustrated in FIG. 1C, it was difficult to reduce the depth of the device because of the CRT display 16 in a relatively small-size switch panel device.

With the switch panel device comprising an LCD 18 as illustrated in FIG. 1D, the use of a wide panel makes the device highly expensive if the indicia are to be displayed in colors.

In the switch panel device having LCD's embedded in the keytops, the LCD's, one being embedded in each of keytops, not only requires a complicated image displaying circuit, but also makes the device very expensive if the display is to be colored.

SUMMARY OF THE INVENTION

According to the teachings of this invention, an LCD projector is disposed inside of a switch panel having switch elements. The LCD projector is adapted to project images of indicia such as characters, symbols and figures for identifying individual switch elements on the switch panel adjacent to the corresponding switch elements such that the projected images are visible from the outside face of the switch panel.

The operating ends of the switch elements extend beyond the outer surface of the switch panel, and the projection-displayed switch element-identifying images appear in juxtaposition to the corresponding operating ends.

The switch panel may include a touch switch sheet having an array of transparent touch switches as the switch elements. The switch element-identifying images are adapted to be projected on the corresponding touch switches. A click sheet is applied to the front surface of the touch sheet, and the click sheet is formed with forwardly bulged portions in opposed relation with the corresponding touch switches.

The switch panel may comprise a transparent support plate having tact switches attached to the front surface thereof, and a keytop board disposed in opposed relation with the front surface of the plate. The keytop board is formed with cantilevered keytops defined by slits, each keytop being arranged to control the associated tact switch.

DESCRIPTION OF THE PREFERRED EMBODIMENTS

Figure 1A:
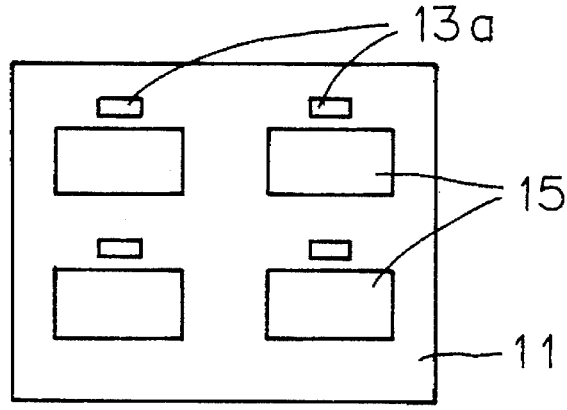
FIG. 1A is a front view of one type of prior art switch pane device.
Figure 1B:
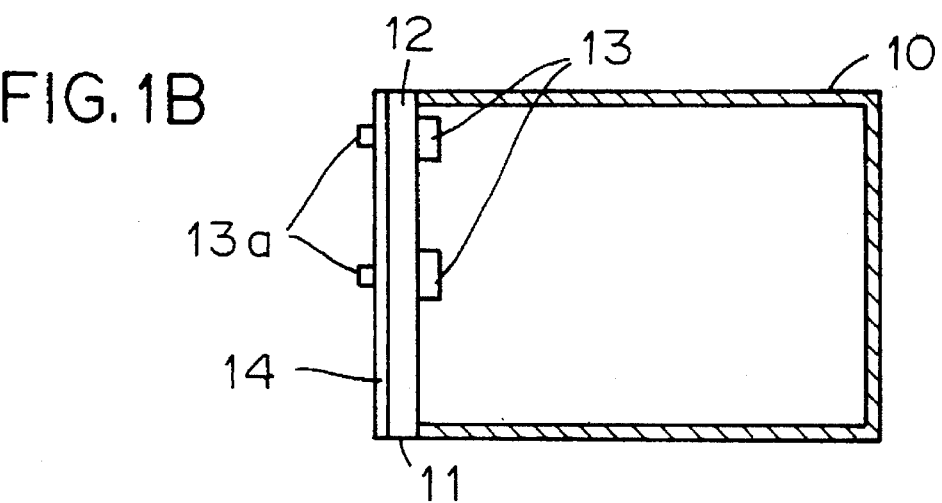
FIG. 1B a vertical cross-sectional view of the device of FIG. 1A.
Figure 1C:
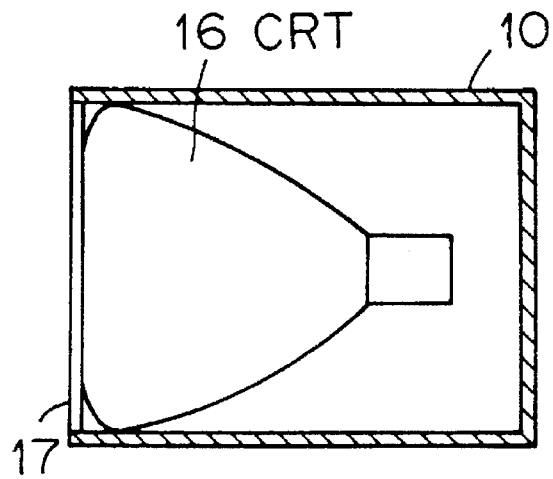
FIG. 1C is a view similar to FIG. 1B but illustrates another type of prior art switch panel device.
Figure 1D:
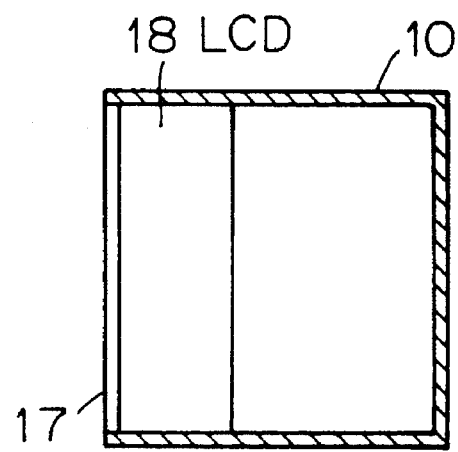
FIG. 1D is a view similar to FIGS. 1B and 1C but illustrates still another type of prior art switch panel device.

Referring to FIGS. 2A to 2E, there is shown one embodiment of this invention wherein corresponding reference numerals are used for those parts which correspond to parts of the device shown in FIG. 1.

A transparent support plate 40 is mounted to a housing 10 so as to close the front opening thereof. A plurality of tact switches or click feel push switches 41 are attached to the front surface of the transparent support plate 40 in an array comprising rows and columns. A keytop board 42 which may be made of flexible plastics such as translucent acrylic resin is disposed in opposed relation with the tact switches 41 and attached to the front face of the support plate 40 by means of spacers 5 interposed therebetween. The keytop board 42 is formed with a plurality of integral cantilevered keytops 44 each defined by a U-shaped slit 43 cut through the board. Each keytop 4 has an integral small protuberance 45 adjacent its free end projecting from the inner surface thereof toward the transparent support plate 40, each protuberance 45 being located in opposed relation with an associated one of the tact switches 41 and adapted to be movable into contact with or close proximity to the operating end of the associated tact switch.

Figure 2A:
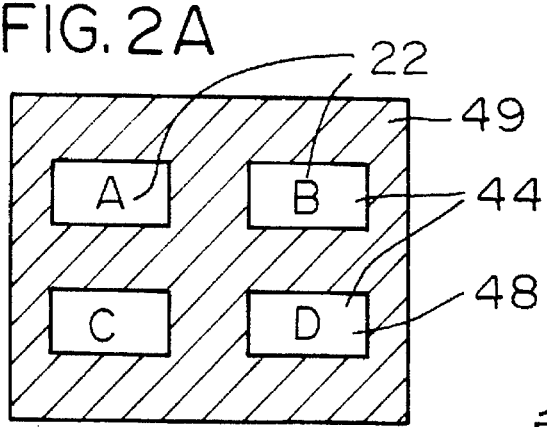
FIG. 2A is a front view of one embodiment of the present invention.
Figure 2B:
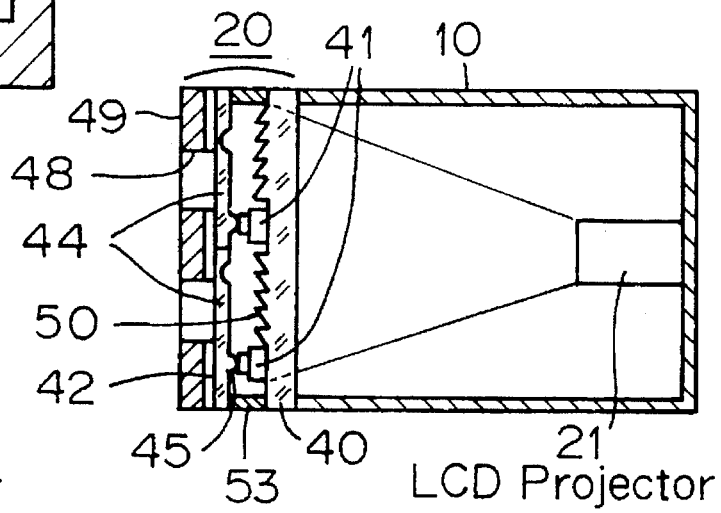
FIG. 2B is a vertical cross-sectional view of the device of FIG. 2A.
Figure 2C:
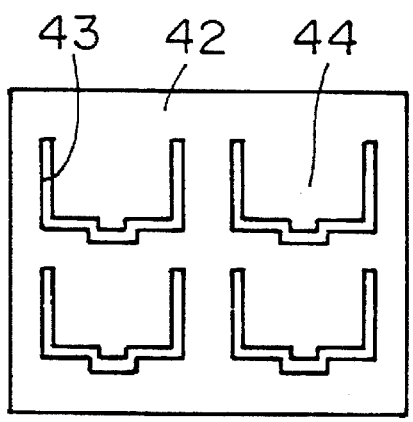
FIG. 2C is a front view showing the keytop board 42 in FIG. 2B.
Figure 2D:
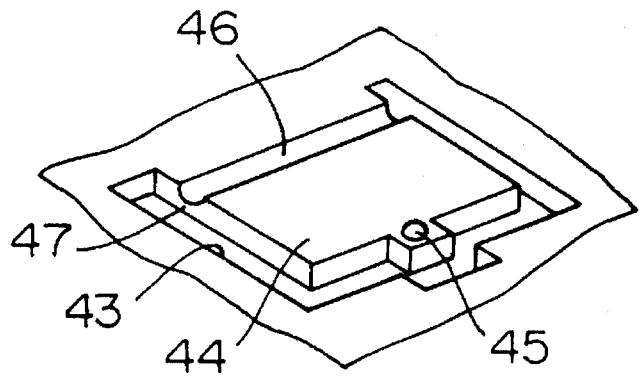
FIG. 2D is an enlarged perspective view of one of the keytops 44 in FIG. 2C.
Figure 2E:
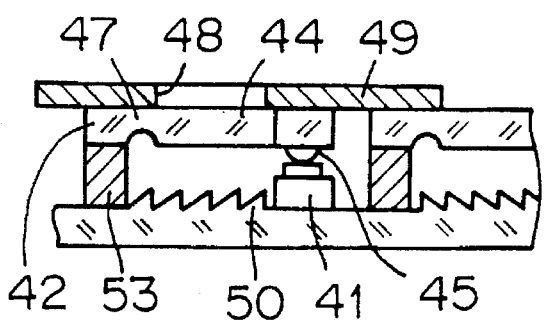
FIG. 2E is an enlarged cross-sectional view of a portion of the device including the switch element 41 and the keytop 44 in FIG. 2B.
Figure 2F:
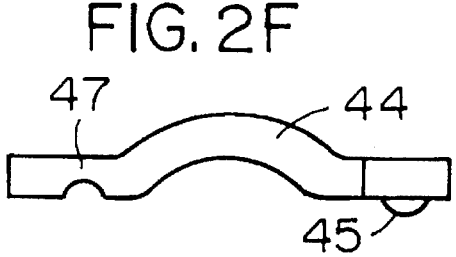
FIG. 2F is a side view of an embodiment in which the keytop has a curved surface.

As shown in FIGS. 2D and 2E, each keytop 44 is formed with a recessed groove 46 along the juncture between the keytop and the remainder of the keytop board 42 to define a thin-walled hinge 47 about which the keytop may be resiliently restored to its home position.

An opaque frame or mask 49 which may be made of black resin material is affixed to the front surface of the keytop board 42, the mask having rectangular openings 48 at locations opposing the respective keytops 44.

As shown in FIG. 2B, an LCD (liquid crystal dusplay) projector 21 is mounted to the inner surface of the rear wall of the housing 0 facing toward the front opening of the housing. The LCD projector 21 is adapted to project enlarged pictures or images 22 of indicia such as characters, symbols and figures for identifying individual switch elements (which are the tact switches 41 in the illustrated embodiment) onto the back face of the transparent support plate 40 so that the projected switch element-identifying images 22 are focused on the corresponding keytops 44. In this embodiment the transparent support plate 40 is formed with integral Fresnel lens 50 over one side surface thereof to provide the projected images 22 with uniform brightness. It is to be noted that those portions of the switch panel 20 except the switch element-identifying images 22 are concealed from vision from the outside.

Display image signals to be input to the LCD projector 21, that is, display image signals to produce switch element-identifying images 22 array be obtained by taking a picture of characters, figures, symbols or the like with a video camera, or by making display images with a personal computer, for example.

The protuberance 45 permits smooth controlling of the operating end of the switch 41 when the keytop 44 is depressed, while the thin-walled hinge 47 facilitates the operation of the keytop 44. The tact switch 41 provides a click feel to the operator as it is pressed down by the keytop 44 to perform the switching function.

FIG. 3 illustrates another embodiment of this invention wherein like reference numerals are used for those parts which correspond to parts of the devices shown in FIGS. 1 and 2. This embodiment is similar to FIG. 1A in that the switch panel 20 comprises a transparent frame 12 having switch elements or push switches 13 secured thereto such that the operating ends 13a of the switch elements 13 project beyond the outer face or front face of the frame 12, but is different in that the sheet 14 having indicia 15 printed thereon is eliminated. Instead, an LCD projector 21 is disposed on the inner (back) side of the switch panel 20. The LCD projector 21 is adapted to project pictures or images 22 of indicia such as characters, symbols and figures for identifying individual switch elements 13 toward the back face of the frame 12 adjacent to the corresponding switch elements 13 such that they are not interfered with by the switch elements.

Figure 3A:
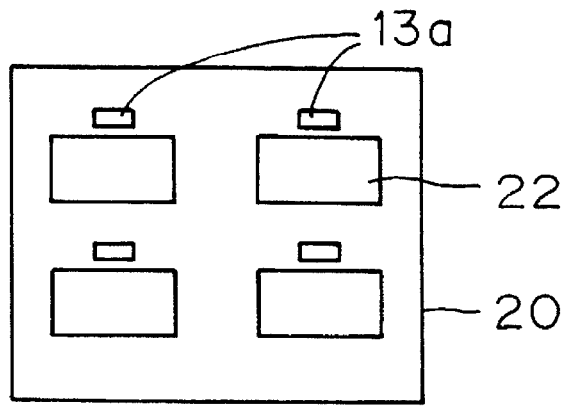
FIG. 3A is a front view of another embodiment of the present invention.
Figure 3B:
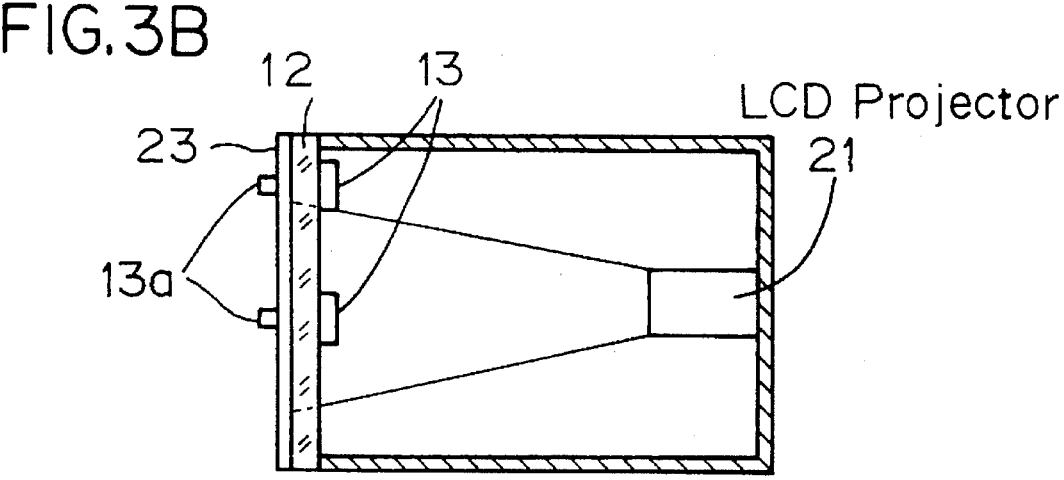
FIG. 3B is a vertical cross-sectional view of the device of FIG. 3A.
Figure 3C:
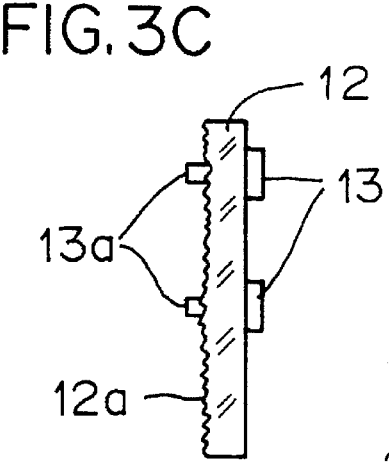
FIG. 3C is a side view showing an alternative form of the switch panel in FIG. 3A.

In this embodiment, the arrangement is such that the switch element-identifying images 22 are visible from the outer (front) side of the switch panel 20 as lying below and in juxtaposition to the corresponding operating ends (keytops) 13a. To this end, the frame 12 is formed of transparent acrylic resin, for example, and in the illustrated embodiment, has a diffusion sheet 23 applied to one side surface thereof for diffusing the light. In place of the combination of the frame 12 and diffusion sheet 23, the frame 12 may be modified as a diffusion plate of appropriate thickness having a light-scattering toughened surface 12a on one side thereof as illustrated in FIG. 3C. At any rate, in this embodiment the frame 12 has a light-scattering layer 23.

Figure 3D:
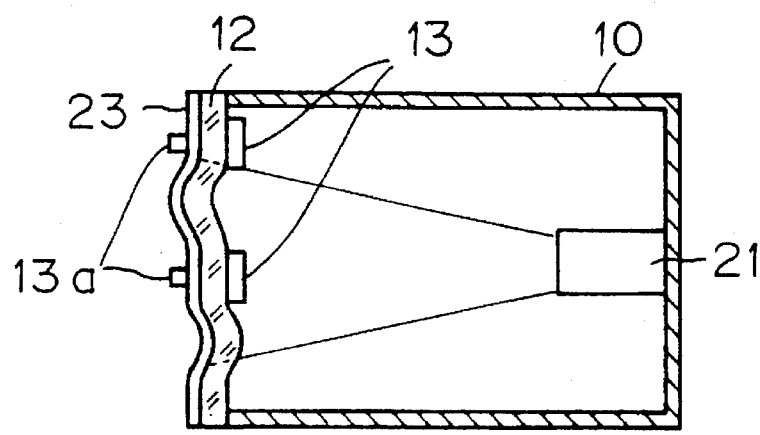
FIG. 3D is a vertical cross-sectional view showing another alternative form of the switch panel in FIG. 3A in which the switch panel has curved surfaces.

Alternatively, curved surface designs may be used for the frame 12 as shown in FIG. 3D rather than the planar surface design.

In this embodiment, the LCD projector 21 is so adjusted as to focus the switch element-identifying images 22 on the diffusion sheet 23 directly below and adjacent to the corresponding operating ends 13a.

Figure 4A:
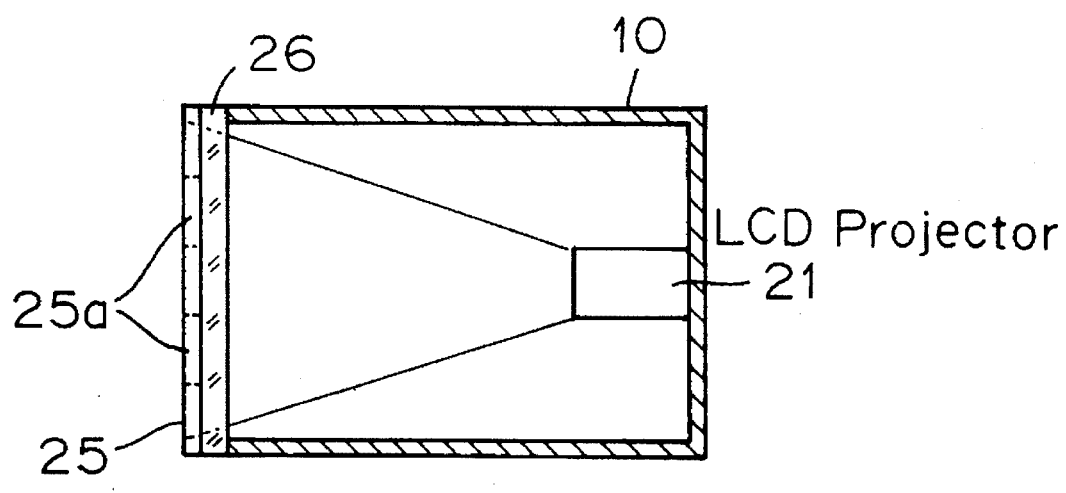
FIG. 4A is a vertical cross-sectional view of an embodiment of the invention utilizing a touch switch sheet.
Figure 4B:
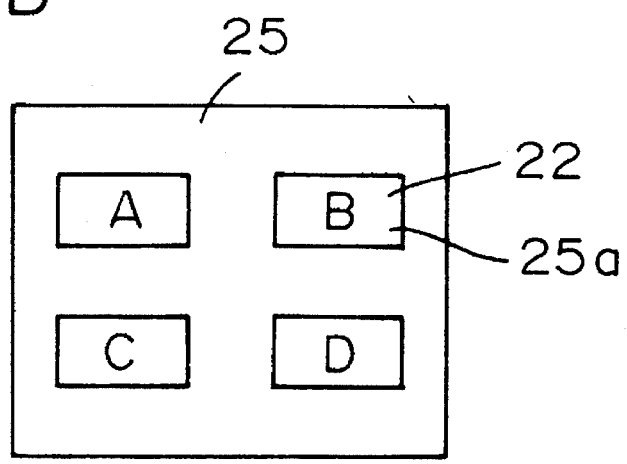
FIG. 4B is a front view of the device of FIG. 4A

FIG. 4 illustrates yet another embodiment of this invention wherein a touch switch sheet 25 is employed which comprises a transparent sheet having an array of switch elements in the form of touch switches 25a comprising transparent electrodes.

One side surface of the touch switch sheet 25 is treated to have light-scattering properties and to be translucent so that the switch element-identifying images 22 may be projected on the touch switch sheet.

The touch switch sheet 25 is backed by a transparent plate 26 such as a transparent acrylic plate to bear the force as applied when the touch switches 25a are depressed. The transparent plate 26 is in turn secured to the housing 10.

The switching operation is performed by pressing the switch elements, that is, those portions of the touch switch sheet 25 comprising the touch switches 25a toward the transparent plate 26. The LCD projector 21 is capable of projecting switch-identifying images 22 of indicia such as characters, symbols and figures on the touch switch sheet 25 at the corresponding touch switches 25a such that the positions of the images 12 are in coincidence with those of the corresponding touch switches 25a.

Figure 5A:
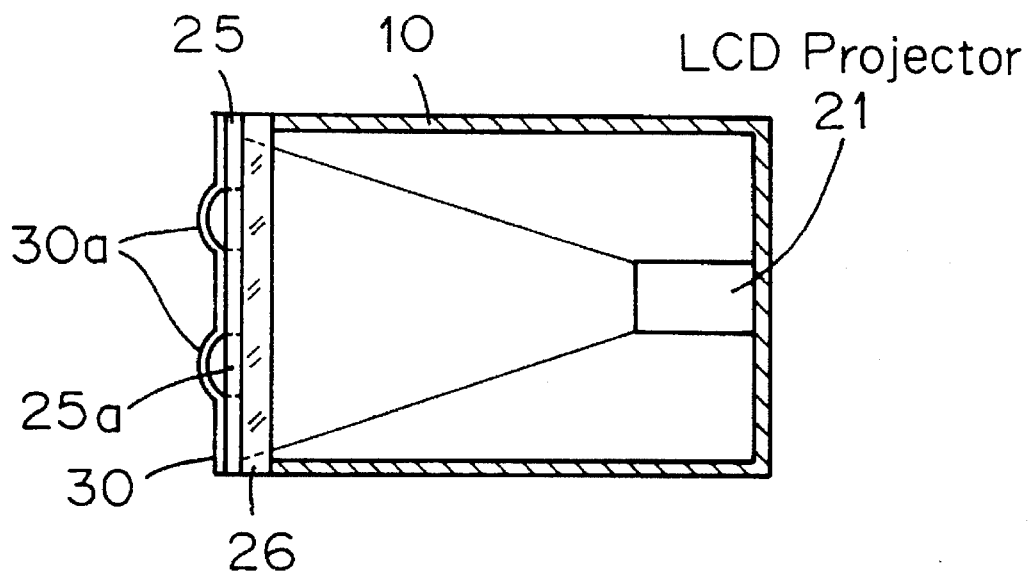
FIG. 5A is a vertical cross-sectional view of an alternative embodiment of the invention in which a "clickfeel" sheet is used as the touch panel in the device of FIG. 4A.

In FIG. 5A a transparent touch switch sheet 25 as in the embodiment of FIG. 4 is used. Applied to the outer surface of the touch switch sheet 25 is a click sheet 30 formed of plastic such as polyester which is capable of click action and has been treated to have light-scattering properties suitable for displaying images. The click sheet 30 is formed with forwardly projecting convexly bulged portions 30a by an embossing process at positions corresponding to the touch switches 25a to provide click-feel.

The LCD projector 21 is operative to project and display the images 22 for identifying touch switches 25a on the corresponding convexly bulged portions 30a. Upon depressing the convexly bulged portion 30a, switching action takes place with a click-feeling.

Figure 5B:
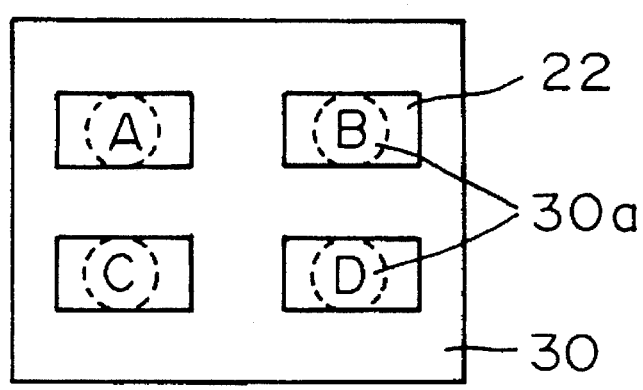
FIG. 5B is a front view of the device of FIG. 5A.

In the embodiments shown in FIGS. 3, 4 and 5, projected display pictures may be constructed to show black background portions except switch element-identifying images 22 as projected by the LCD projector 21, so that the unsightly interior of an associated apparatus or equipment is not likely to be visible through the switch panel 20 since it is generally dark within the interior of such apparatus.

The keytops 44 of FIG. 2 on which images are projected need not be planar, but may be of various configurations such as curved surfaces as desired. For instance, the keytops 44 may have curved surfaces as illustrated in FIG. 2F.

Figure 6A:
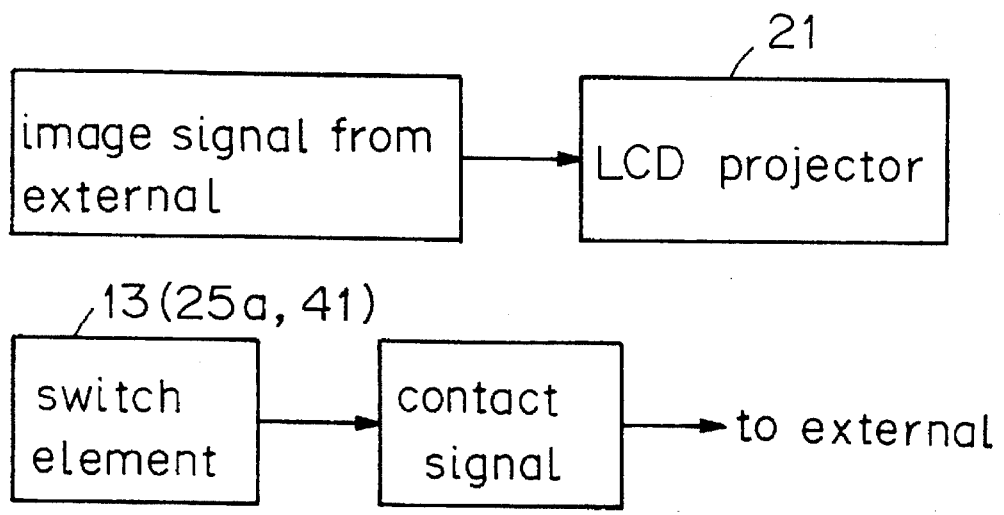
FIG. 6A is a block diagram illustrating an example of the signaling system for the switch panel device according to this invention.

With the various switch parcel devices according to this invention as described above, upon one of the switch elements 13, 25a or 41 being operated, the contact signal of that switch element is output as such to external equipment, and an image signal as input from the equipment will be displayed via the LCD projector 21, as illustrated in FIG. 6A. The relationship between the controlling of the switch elements by the operator and the substance of the image being displayed is determined by an external circuit. For instance, when the switch element 41 displayed is "A" in FIG. 2 is depressed, the contact signal of the switch element 41 is output to the external. Upon receiving this signal, the external circuit will perform the operation corresponding to the switch "A" and at the same time will deliver to the LCD projector 21 an image signal for changing only the portion displayed as "A" to "E" for instance, whereby the portion displayed as "A" in FIG. 2 will be displayed as "E". In this state, if the switch element displayed as "E" (the same switch element that was previously displayed as "A") is depressed, the contact signal corresponding to the upper lefthand switch element as viewed in FIG. 2A is output to the external as s contact signal of the switch element.

Figure 6B:
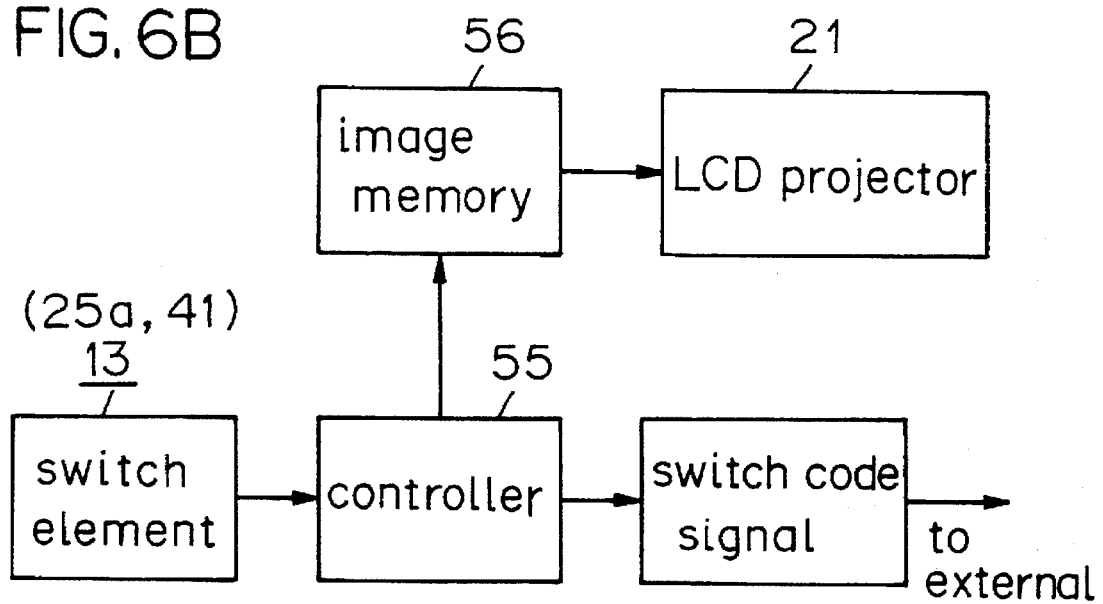
FIG. 6B is a block diagram illustrating another example of the signaling system for the switch panel device according to this invention.

Alternatively, as illustrated in FIG. 6B, the contact signal of the switch element 41 may be processed by a controller or processor 55 disposed in the switch panel device of this invention to output to the external a signal (code) according to the information displayed in correspondence to the depressed switch element, rather than outputting the contact signal of the depressed switch element as such.

By way of example, if the switch element 41 displayed as "A" in FIG. 2 is depressed, a code corresponding to "A" is output to the external while at the same time the image signal is read out from an image memory 56 and transmitted to the LCD projector 21 so that a preset other indicia such as "E" for example is displayed at the position previously displayed as "A". Then, if the switch element now displayed as "E" (the same switch element that was previously displayed as "A") is depressed, a code corresponding to "E" is output to the external. That is, a code corresponding to the number of times a particular switch element is depressed (or depending on whether the number of times of depression is odd or even) is output to the external.

As discussed above, according to this invention, indicia for identifying switch elements are projection-displayed as images via an LCD projector, so that switch element identifying indicia may be displayed readily and quickly and it is possible to meet the user's request for short time delivery as well as alteration of switch element-identifying indicia.

In addition, since display images are projection-displayed on the face of a switch panel from an LCD projector, the switch panel face may be of any desired configuration such as curved surfaces to permit freedom in designing the configuration of the switch panel.

Moreover, this invention makes it possible to display the information in colored images which may be altered in accordance with the operation of the associated equipment under the control of the switch elements, in addition to the function of the conventional illuminated switch, and further can provide a plurality of illuminated switches with high performance at a low cost, since this invention enables a single LCD projector to make displays for a plurality of illuminated switch elements.

For a switch panel having a relatively small surface area, this invention makes it possible to reduce the depth of the device as compared to the prior art switch panel device utilizing a CRT display. In addition, owing to the projection-displaying system, the liquid crystal panel for the LCD projector may be greatly reduced in size in terms of the surface area as compared to the comparable switch system in which touch switches are disposed directly on a liquid crystal display, and especially in the case of colored display, it is possible to provide a switch panel having a large surface area at a low cost.

We claim:

1. A switch panel device comprising:
   a switch panel having a plurality of switch elements; and
   an LCD projector disposed behind and spaced apart from said switch panel for projecting enlarged switch element-identifying images of indicia such as characters, symbols and figures identifying said switch elements onto portions of said switch panel that are respectively adjacent to the corresponding switch elements, those portions of said switch panel on which said enlarged switch element-identifying images are projected being visible from an outer surface of the switch panel.

2. The switch panel device of claim 1 wherein said switch panel comprises a transparent support plate having tact switches attached to the front surface thereof to constitute said switch elements, and a keytop board made of translucent material, said keytop board being disposed in opposed relation with the front surface of said support plate and being formed with a plurality of cantilevered keytops, each facing an associated one of said tact switches and arranged to control the associated tact switch, and said switch element-identifying images being adapted to be formed on the corresponding keytops.

3. The switch panel device of claim 2 wherein an opaque frame is affixed to the front surface of said keytop board, said frame being formed with openings, each opening facing a corresponding one of said keytops.

4. The switch panel device of claim 2 or 3 wherein said keytop board is made of flexible material, each of said keytops being formed integrally with said board by a U-shaped slit out through the board, and each keytop being formed with a groove along the juncture between the keytop and the remainder of the keytop board to define a thinwalled hinge.

5. The switch panel device of claim 4 wherein each of said keytops has an integral protuberance projecting from the inner surface thereof in opposed relation with an associated one of the tact switches and in contact with or close proximity to an operating end of the associated tact switch.

6. The switch panel device of claim 2 or 3 wherein said transparent support plate is formed over one side surface thereof with an integral Fresnel lens.

7. The switch panel device of claim 1 wherein said switch panel comprises a transparent frame having said switch elements secured thereto and a light-scattering layer for scattering light formed on one side surface of said frame, operating ends of said switch elements projecting beyond the front surface of the switch panel, and said switch element-identifying images being adapted to be projected on said light-scattering layer in juxtaposition to the corresponding operating ends.

8. The switch panel device of claim 7 wherein said light-scattering layer is a light diffusion sheet affixed to said frame.

9. The switch panel device of claim 7 wherein said light-scattering layer comprises a toughened surface formed on one side surface of said frame.

10. The switch panel device of claim 1 wherein said switch panel comprises a transparent plate and a translucent touch switch sheet, said touch switch sheet comprising a translucent sheet having touch switches composed of transparent electrodes, and said switch element-identifying images being adapted to be projected on the corresponding touch switches.

11. The switch panel device of claim 10 wherein a click sheet is applied to the front surface of the touch switch sheet, said click sheet being formed with forwardly projecting hemispherically bulged portions in opposed relation with the corresponding touch switches.

12. The switch panel device of any one of claims 2, 3 or 7 to 11 wherein background portions of images other than switch element-identifying portions of images, as projected by said LCD projector, are of uniform dark color such as black.

13. The switch panel device of any one of claims 2, 3 or 7 to 11 further including an image memory for storing various image signals to be projected by the LCD projector, and a controller for receiving a contact signal of a selected one of said switch elements, said controller outputting a code to an external equipment depending on the number of times said selected switch element is depressed and at the same time selecting and reading one of said image signals out of said image memory and transmitting it to said LCD projector to alter the switch element-identifying image for said selected switch element corresponding to said code.

* * * * *